(12) United States Patent
Farnham et al.

(10) Patent No.: US 11,320,074 B2
(45) Date of Patent: *May 3, 2022

(54) NO CONTACT CONNECTORS

(71) Applicant: The Ford Meter Box Company, Inc., Wabash, IN (US)

(72) Inventors: Scott C. Farnham, Logansport, IN (US); Kevin J. Bretzman, Wabash, IN (US); Steven R. Ford, Wabash, IN (US); Rex G. Forbes, Fort Wayne, IN (US); Hans C. Lassen, Pell City, AL (US); Zachary J. Gentile, Jr., Trussville, AL (US)

(73) Assignee: The Ford Meter Box Company, Inc., Wabash, IN (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/531,395

(22) Filed: Aug. 5, 2019

(65) Prior Publication Data

US 2020/0003346 A1 Jan. 2, 2020

Related U.S. Application Data

(63) Continuation of application No. 15/623,634, filed on Jun. 15, 2017, now Pat. No. 10,371,296.

(Continued)

(51) Int. Cl.
*F16L 25/02* (2006.01)
*F16L 58/18* (2006.01)
(Continued)

(52) U.S. Cl.
CPC .......... *F16L 25/026* (2013.01); *F16K 5/0642* (2013.01); *F16K 5/0689* (2013.01);
(Continued)

(58) Field of Classification Search
CPC ... F16L 25/026; F16L 58/185; F16L 25/0072; F16L 25/14; F16L 19/0218; F16L 25/025; F16K 5/0642; F16K 5/0689
(Continued)

(56) References Cited

U.S. PATENT DOCUMENTS 2,950,928 A * 8/1960 Bowan ................... F16L 25/023
285/52
3,764,169 A * 10/1973 St. Clair ............. F16L 19/0218
285/52

(Continued)

OTHER PUBLICATIONS

The Ford Meter Box Company, Inc.; Ford Couplings for Pipe and Tubing; Wabash.*

(Continued)

*Primary Examiner* — James M Hewitt, II
(74) *Attorney, Agent, or Firm* — Barnes & Thornburg LLP

(57) ABSTRACT

A coupling body having an opening and configured to receive a pipe in the opening. The coupling body is made of a metal material and the pipe is made of a different metal material to the metal material of the coupling body. An insulating sleeve lines at least a portion of an inner periphery of the coupling body adjacent the opening. The insulating sleeve is made of non-metallic material and is configured to serve as a physical non-metallic barrier between the metal material of the coupling and the different metal material of the pipe so the different metal material of the pipe does not contact the metallic material of the coupling body.

13 Claims, 16 Drawing Sheets

Related U.S. Application Data

(60) Provisional application No. 62/351,028, filed on Jun. 16, 2016.

(51) Int. Cl.
*F16L 25/00* (2006.01)
*F16L 25/14* (2006.01)
*F16L 19/02* (2006.01)
*F16K 5/06* (2006.01)

(52) U.S. Cl.
CPC ....... *F16L 19/0218* (2013.01); *F16L 25/0072* (2013.01); *F16L 25/025* (2013.01); *F16L 25/14* (2013.01); *F16L 58/185* (2013.01)

(58) Field of Classification Search
USPC .................................................. 285/148.11
See application file for complete search history.

(56) References Cited

U.S. PATENT DOCUMENTS

| | | | | |
|---|---|---|---|---|
| 4,848,804 A | * | 7/1989 | Weigl | F16L 25/023 |
| | | | | 285/52 |
| 5,447,340 A | * | 9/1995 | Sands | F16L 25/023 |
| | | | | 285/328 |
| 10,371,296 B2 | * | 8/2019 | Farnham | F16K 5/0642 |
| 2007/0080310 A1 | * | 4/2007 | Lum | F16L 19/025 |
| | | | | 251/148 |
| 2009/0127803 A1 | * | 5/2009 | Chelchowski | F16L 19/065 |
| | | | | 277/622 |

OTHER PUBLICATIONS

The Ford Meter Box Company, Inc.; Ford Water Meter Couplings and Accessories; Wabash.*

* cited by examiner

INTEGRAL POSITIVE STOP
SEPARATING MATERIALS and second metal materials of the coupling body, and the first pack joint nut, respectively, are a brass alloy; the dissimilar metal of the first pipe being selected from the group consisting of copper and lead; the non-metallic materials of the insulating sleeve and the split insulating gripper sleeve are selected from the group consisting of acetal, polypropylene, polyphenylene oxide, nylon, and polyethylene; the non-metallic materials of the insulating sleeve and the split insulating gripper sleeve are a polymer; the split insulating gripper sleeve including gripping features in the form of ridges that assist gripping the first pipe; the second pack joint nut being made of the second metal material and the second pack joint nut being configured to receive a portion of a second pipe wherein the second pipe is made of the dissimilar metal material to the second metal material; the second pack joint nut includes a split insulating gripper sleeve configured to line at least a portion of an inner periphery of the second pack joint nut, wherein the split insulating gripper sleeve of the second pack joint nut is made of a non-metallic material; a second gasket located adjacent the split insulating gripper sleeve of the second pack joint nut so there is no physical contact between the second pipe and the second metal material of the second pack joint nut; a third pack joint nut spaced apart from the first and second pack joint nuts that is made of the second metal material, and the third pack joint nut is configured to receive a portion of a third pipe wherein the third pipe is made of the dissimilar metal material to the second metal material; the third pack joint nut includes a split insulating gripper sleeve configured to line at least a portion of an inner periphery of the third pack joint nut, and the split insulating gripper sleeve of the third pack joint nut is made of a non-metallic material; a third gasket located adjacent the split insulating gripper sleeve of the third pack joint nut so there is no physical contact between the third pipe and the second metal material of the third pack joint nut.

NO CONTACT CONNECTORS

RELATED APPLICATIONS

The present application is a continuation of application Ser. No. 15/623,634 filed on Jun. 15, 2017 entitled No Contact Connectors, now U.S. Pat. No. 10,371,296, and claims priority to U.S. Provisional Patent Applications, Ser. No. 62/351,028, filed on Jun. 16, 2016. The subject matter disclosed in that provisional application is hereby expressly incorporated into the present application in its entirety.

TECHNICAL FIELD AND SUMMARY

The present disclosure is related to metal alloy waterworks couplings, and particularly to such couplings that connect to metal pipes of dissimilar alloys, wherein at least one of the metal pipes does not contact the dissimilar metal of the metal coupling.

Lead water pipes are well-known in the waterworks industry, and in 2016 have garnered attention because of potential for lead leaching into the water. Research suggests that a source of lead getting into water may be from bi-metallic corrosion of the lead due to contact between pipes made from dissimilar metals. (See "Contribution of Galvanic Corrosion to Lead in Water After Partial Lead Service Line Replacements," Web Report #4088b, Water Research Foundation (2010); and "Bi-Metallic Corrosion," National Physical Laboratory (1982, 2000)).

To ameliorate this, an illustrative embodiment of the present disclosure provides metal pipe couplings for lead and other metal pipes that isolate at least one of those pipes from contacting a metal surface, thereby preventing direct metal-to-metal contact between the two metal structures. Another illustrative embodiment of the present disclosure is directed to a pipe coupling comprising a coupling body, first and second pack joint nuts, an insulating sleeve, a split insulating gripper, a gasket, and a flange. The coupling body includes first and second ends. The first pack joint nut is located at the first end of the coupling body. The second pack joint nut is located at the second end of the coupling body. The coupling body is made of a first metal material and the first pack joint nut is made of a second metal material. The first pack joint nut is configured to receive a portion of a first pipe. The first pipe is made of a dissimilar metal material to the first and second metal materials of the coupling body and the first pack joint nut. The insulating sleeve is configured to line at least a portion of an inner periphery of the coupling body. The split insulating gripper sleeve is configured to line at least a portion of an inner periphery of the first pack joint nut. The insulating sleeve and split insulating gripper sleeve are made of non-metallic materials. The gasket is located between the insulating sleeve and the split insulating gripper sleeve. The radially inward flange is located on the insulating sleeve to provide a positive stop for the first pipe. The insulating sleeve, split insulating gripper sleeve, and gasket, serve as physical non-metallic barriers between the first/second metal materials of the coupling/first pack joint nut, and the dissimilar metal material of the first pipe.

In the above and other illustrative embodiments, the joint coupling may further comprise: the flange of the insulating sleeve extending inward toward a central axis of the pack joint coupling, wherein the flange maintains an opening to allow fluid to pass through the pipe, and wherein a gap is formed by both the coupling body and the flange; the first and second metal materials of the coupling body, and the first pack joint nut, respectively, are a brass alloy; the Another illustrative embodiment of the present disclosure provides a pipe coupling that includes a coupling body, a first pack joint nut, and first and second sleeves. The coupling body has first and second ends. The first pack joint nut is located at the first end of the coupling body. The coupling body is made of a first metal material and the first pack joint nut is made of a second metal material. The first pack joint nut is configured to receive a portion of a first pipe. The first pipe is made of a dissimilar metal material to the first and second metal materials of the coupling body and the first pack joint nut, respectively. The first sleeve is configured to line at least a portion of an inner periphery of the coupling body. The second sleeve is configured to line at least a portion of an inner periphery of the first pack joint nut. The first and second sleeves are made of non-metallic materials, and serve as physical non-metallic barriers between the first/second metal materials of the coupling/first pack joint nut, and the dissimilar metal material of the first pipe.

In the above and other illustrative embodiments, the joint coupling may further comprise: a gasket located between the first and second sleeves; a flange located on the first sleeve to provide a positive stop for the first pipe when entering the pipe coupling; a second pack joint nut located at the second end of the coupling body, wherein the second pack joint nut is made of the second metal material, the second pack joint nut is configured to receive a portion of a second pipe wherein the second pipe is made of the dissimilar metal material to the second metal material; the second pack joint nut includes a second sleeve configured to line at least a portion of an inner periphery of the second pack joint nut, wherein the second sleeve of the second pack joint nut is made of a non-metallic material, and wherein the second pack joint nut is located about perpendicular to the first pack joint nut; a second gasket located adjacent the second sleeve of the second pack joint nut so there is no physical contact between the second pipe and the second metal material of the second pack joint nut; a third pack joint nut spaced apart from the first and second pack joint nuts that is made of the second metal material, and the third pack joint nut is configured to receive a portion of a third pipe wherein the third pipe is made of the dissimilar metal material to the second metal material, wherein the third pack joint nut includes a second sleeve configured to line at least a portion of an inner periphery of the third pack joint nut, and wherein the second sleeve of the third pack joint nut is made of a non-metallic material; and an opening in the coupling body that is spaced apart from the first pack joint nut, and oriented perpendicular to the first pack joint nut.

Additional features of the present disclosure will become apparent to those skilled in the art upon consideration of illustrative embodiments of the disclosure as presently perceived.

BRIEF DESCRIPTION OF THE FIGURES

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
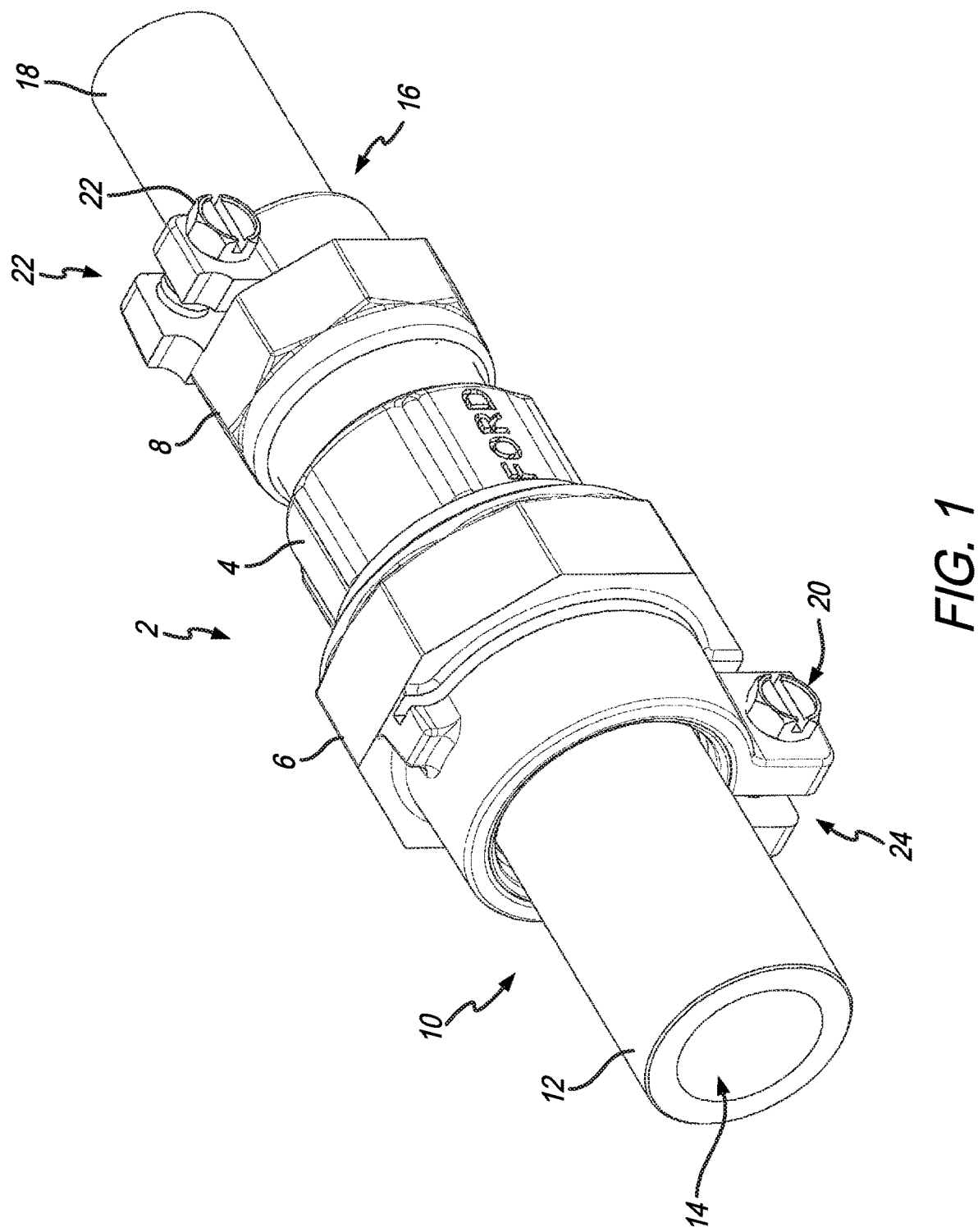
FIG. 1 is a perspective view of an illustrative pack joint coupling according to the present disclosure.

The exemplification set out herein illustrates embodiments of the joint coupling, and such exemplification is not to be construed as limiting the scope of the joint coupling in any manner.

DETAILED DESCRIPTION OF ILLUSTRATIVE EMBODIMENTS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but to the contrary, the intention is to cover all modifications, equivalents, and alternatives falling within the spirit and scope of the present disclosure.

An illustrative embodiment of the present disclosure provides metal pipe couplings for lead and other metal pipes that isolate at least one of those pipes from contacting a metal surface, thereby preventing direct metal-to-metal contact between the two metal structures. For example, a pack joint coupling may include brass fittings (or other like metal) that secure the ends of two adjoining pipes. At least one of the end portions of the coupling, however, includes a sleeve made of a nonmetallic material that surrounds an end portion of a pipe, such as a lead pipe, so it does not physically contact the metal from the coupling or the adjoining metal pipe.

In an embodiment, the sleeve is positioned within the coupling and is located between the inserted lead pipe and the metal coupling. In another embodiment, the nonmetallic sleeve may include a face or spacer portion that is positioned in the coupling between the lead pipe and the adjoining dissimilar metal pipe so there is no direct metal-to-metal contact between the two pipes either. The sleeve spacer serves as a barrier between the end surfaces of the two adjoining pipes allowing fluid to flow between the two but preventing the direct metal-to-metal contact.

Another illustrative embodiment of the disclosure provides multiple sleeves to accommodate multiple coupling portions that may be part of the coupling assembly. A gasket that is typically located inside the coupling assembly may be located between a first sleeve portion and a second sleeve portion. Either one or both of the sleeves may include gripping structures to assist in the mechanical coupling operation beyond just separating dissimilar metals.

It is appreciated that different types of joints such as compression and stab-fit connections may include these insulating sleeves. Further examples include pack joint couplings, quick joint couplings, grip joint couplings, ultra-tight couplings, lead pack couplings, meter couplings, and lok-pak meter couplings.

A perspective view of an illustrative pack joint coupling is shown in FIG. 1. This illustrative coupling includes a coupling body 4, a first pack joint nut 6, and a second pack joint nut 8. In this illustrative embodiment, coupling body 4, and first and second pack joint nuts 6 and 8, may all be made primarily of a metal such as a brass alloy. Extending from first end 10 is a pipe 12 made of a metal such as lead. Pipe 12 includes a through bore 14 through which water flows. A second end 16 of pack joint coupling 2 has a second pipe 18 extending therefrom. It is appreciated that this second pipe 18 may be composed of a second dissimilar metal from the lead pipe 12. An example of such a dissimilar metal may be copper. Also shown are hex head fasteners 20 and 22 that pinch flange ends 24 and 26, respectively, together to help secure first and second pack joint nuts 6 and 8 to their respective pipes 12 and 18. As such, in this illustrative embodiment, lead pipe 12 is coupled to an illustratively brass pack joint coupling 2 as well as copper pipe 18. But as demonstrated herein, lead pipe 12 does not actually contact the brass metal of either pack joint coupling 2 or copper pipe 18.

Figure 2:
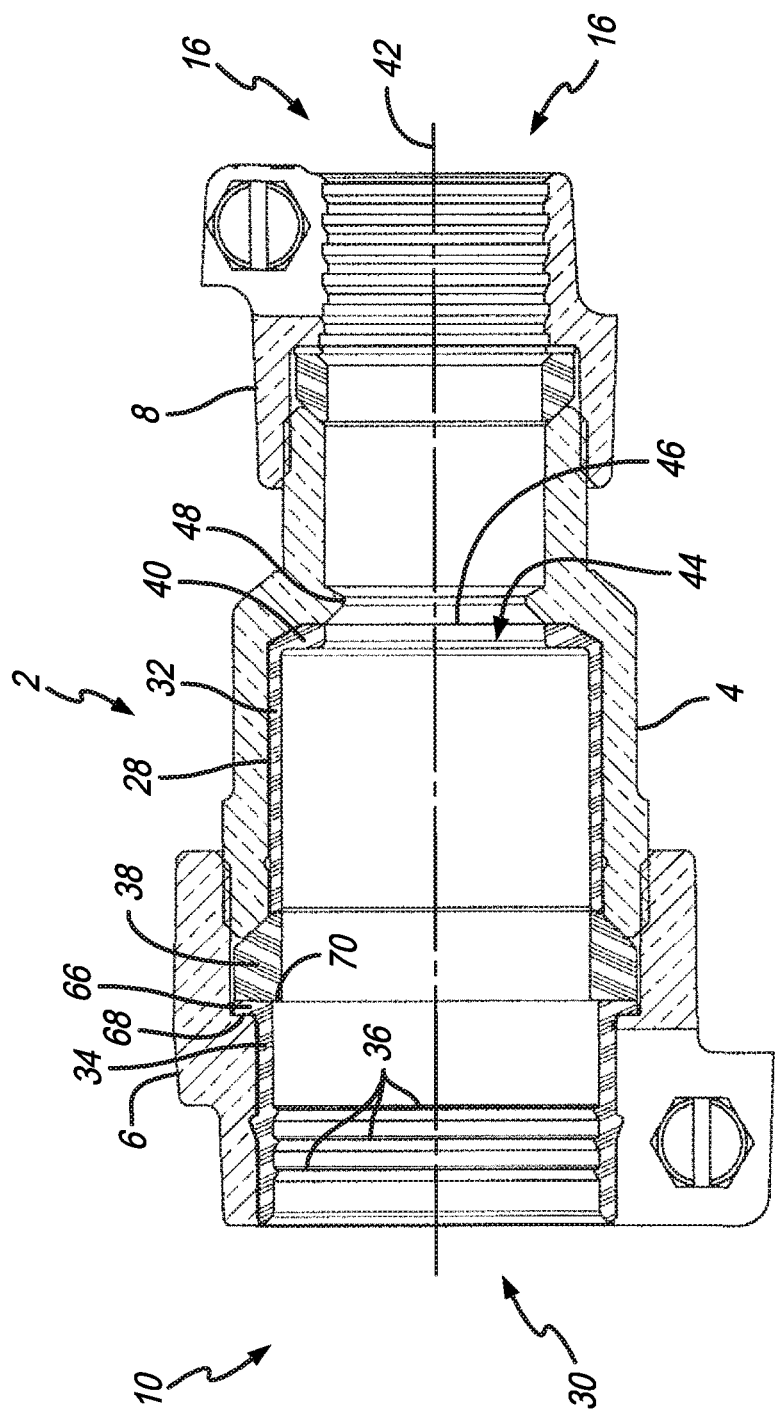
FIG. 2 is a cross-sectional view of the pack joint coupling.

A cross-sectional view of pack joint coupling 2 is shown in FIG. 2. Lead pipe 12 and copper pipe 18 have been removed for clarity purposes but in the illustrative embodiment, lead pipe 12 would typically be inserted into first end 10 of pack joint coupling 2, and copper pipe 18 would be inserted into second end 16 also of pack joint coupling 2. In the interior periphery 28 of coupling body 4 which forms opening 30 through which pipe 12 extends, an insulating sleeve 32 is fitted. Illustratively, insulating sleeve 32 may be made of a polymer material such as acetal, polypropylene, polyphenylene oxide, nylon, and polyethylene. A split insulating gripper sleeve 34 lines the inner periphery of first pack joint nut 6. In the illustrative embodiment, sleeve 34 includes gripping features 36 illustratively in the form of ridges to assist gripping pipe 12 when inserted therethrough. As shown, sleeves 32 and 34 sandwich gasket 38, which may be a conventional gasket used in compression couplings such as pack joints. Gasket 38 is compressed by first pack joint nut 6, to create a seal around pipe 12. It is appreciated from this view that when pipe 12 is inserted into opening 30, sleeves 32 and 34, as well as gasket 38, shroud the circumference of the end portion of pipe 12 so it does not come into direct contact with the metal material of either coupling body 4 or first pack joint nut 6.

Additionally, sleeve 32 may include a rim flange 40 that extends inward toward central axis 42 of pack joint coupling 2. Rim flange 40 still maintains an opening 44 to allow fluid to pass through from first end 10 of pack joint coupling 2 while at the same time positively stops the end surface of a pipe to limit the extent through which it can extend into pack joint coupling 2. A gap or insulating space 46 is formed illustratively by coupling body 4, sleeve 32, and rim flange 40. This creates a space that will exist even when pipe 18 is inserted through second end 16 of pack joint coupling 2. Again, in this and other embodiments this barrier prevents the actual end surfaces of each pipe from coming into contact with each other. Flange 48 illustratively located adjacent rim flange 40 limits the extent to which pipe 18 may be inserted into pack joint coupling 2 at end 16. It is also evident from this view that because lead pipe 12 is essentially shrouded in a plastic sleeve yet secured to a copper pipe via pack joint coupling 2, water is able to pass through both pipes 12 and 18 but lead pipe 12 is not actually contacting any dissimilar metal.

Figure 3:
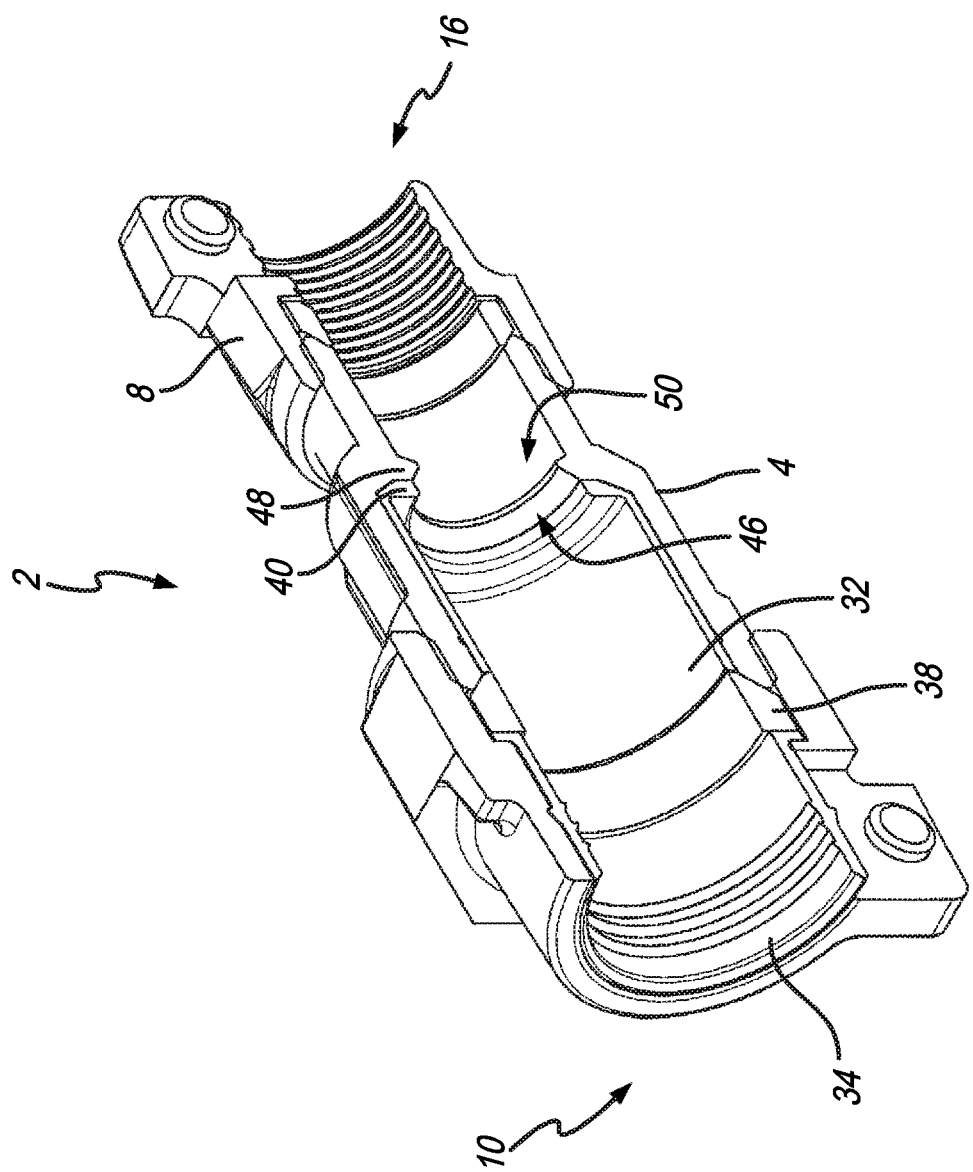
FIG. 3 is a perspective cross-sectional view of the pack joint coupling.

A perspective cross-sectional view of pack joint coupling 2 is shown in FIG. 3. This view in particular, depicts the through bore space 50 disposed from end 10 to end 16 of pack joint assembly 2. It also shows how rim flange 40 buttressed by flange 48 of coupling body 4 provides a positive stop for the end of pipe 12. Stopping the end of pipe 12 at rim flange 40 when combined with the spacing created by flange 48 for pipe 18 creates the insulating space 46 between the two pipes when coupled together. This view further depicts the positioning of insulating sleeve 32, gasket 38, and insulating gripper sleeve 34. With neither of these insulating structures made of metal but rather of illustratively plastic and rubber, for example, they are serving as a physical non-metallic barrier between lead and copper (or other dissimilar metal). It is also appreciated from this view that since the lead pipes such as pipe 12 from FIG. 1 is physically insulated from contacting a dissimilar metal, pipe 18 may be inserted into second pack joint nut 8 and coupling body 4 as normal.

Figure 4:
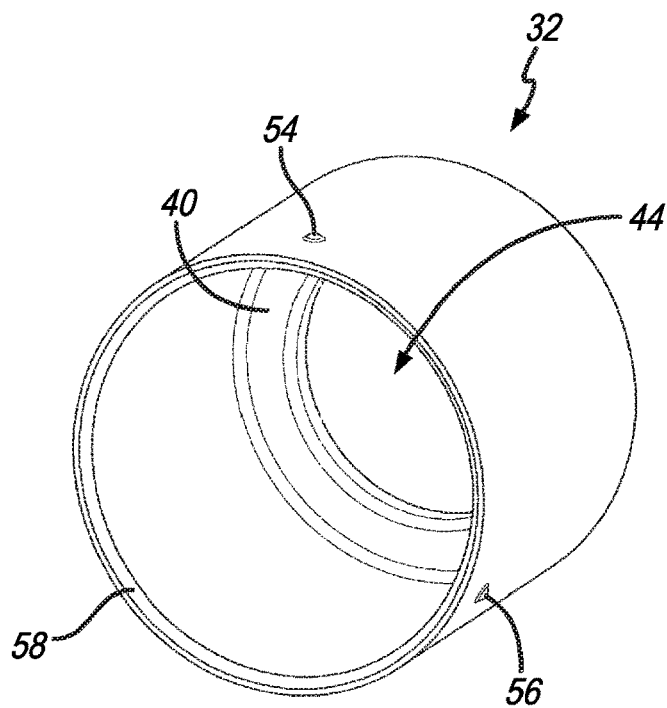
FIG. 4 is an isolated perspective view of an insulating sleeve.

An isolated perspective view of insulating sleeve 32 is shown in FIG. 4. This view further depicts how its cylindrical shape shrouds the outer periphery of a pipe while rim flange 40 provides a positive stop thereby preventing the end face of a pipe from engaging an end face of an adjoining pipe while still allowing fluid to pass through opening 44. This view further shows retention dimples 54 and 56 to retain the sleeve in the coupling when disjoining the pipe and coupling body or removing the pack joint nut from the coupling body. It is appreciated 2 or 3 dimples may be used to hold sleeve 32. With sleeve 32 inserted into body 4 contact between dissimilar metals are prevented. This view further shows rim 58 located opposite rim flange 40 on sleeve 32. Illustratively, rim 58 may be angled and countersunk, or otherwise formed to abut the end of gasket 38 like that shown in FIG. 3.

Figure 5:
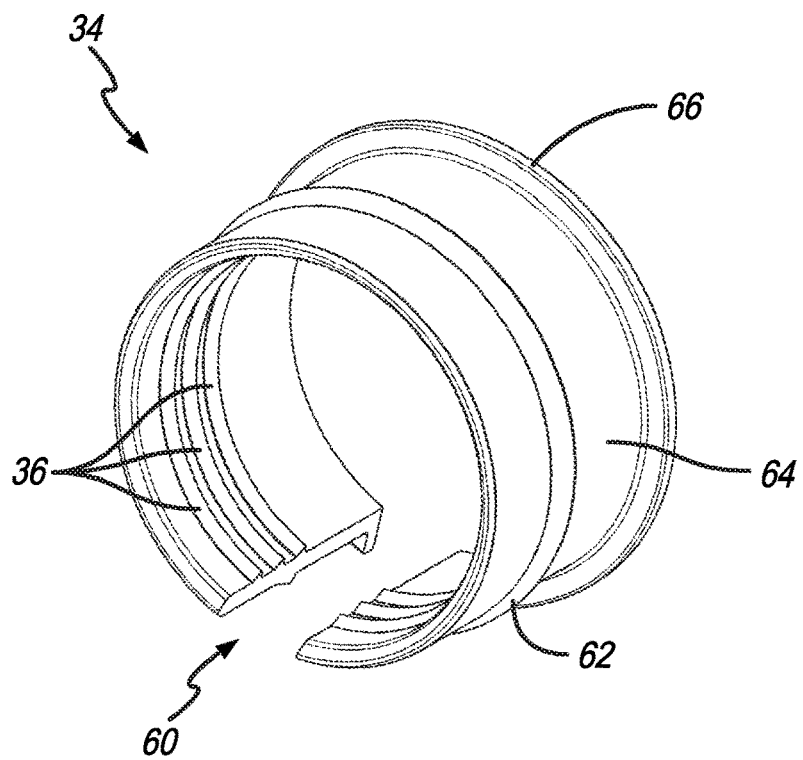
FIG. 5 is a perspective view of insulating gripper sleeve.

A perspective view of insulating gripper sleeve 34 is shown in FIG. 5. In the illustrative embodiment of pack joint coupling 2, sleeve 34 is configured to be received in first pack joint nut 6 (see, also, FIGS. 2 and 3). Because first pack joint nut 6 is configured to have flange end 24 reduce the opening 30 when hex nut fastener 20 engages in same, sleeve 34 may include a split gap 60 along its body so its diameter may coincide with that of first pack joint nut 6. Also shown are the gripping features 36 that engage the outer peripheral surface of pipe 12 to further assist creating a gripping and holding force by pack joint coupling 2 on pipe 12. Sleeve 34 may include a ridge 62 located on the outer peripheral surface 64. Ridge 62 is illustratively configured to fit in a corresponding recess in the inner periphery of first pack joint nut 6 in order to hold sleeve 34 in place. Also included in this illustrative embodiment is an outwardly extending edge flange 66. As shown in FIG. 2, for example, ridge flange 66 abuts a ledge 68 forming an inner periphery of first pack nut joint 6 and abuts a top surface 70 of gasket 38 to hold same in place and assist adding compression onto gasket 38 when tightening pack joint coupling 2 onto pipe 12.

Figure 6A:
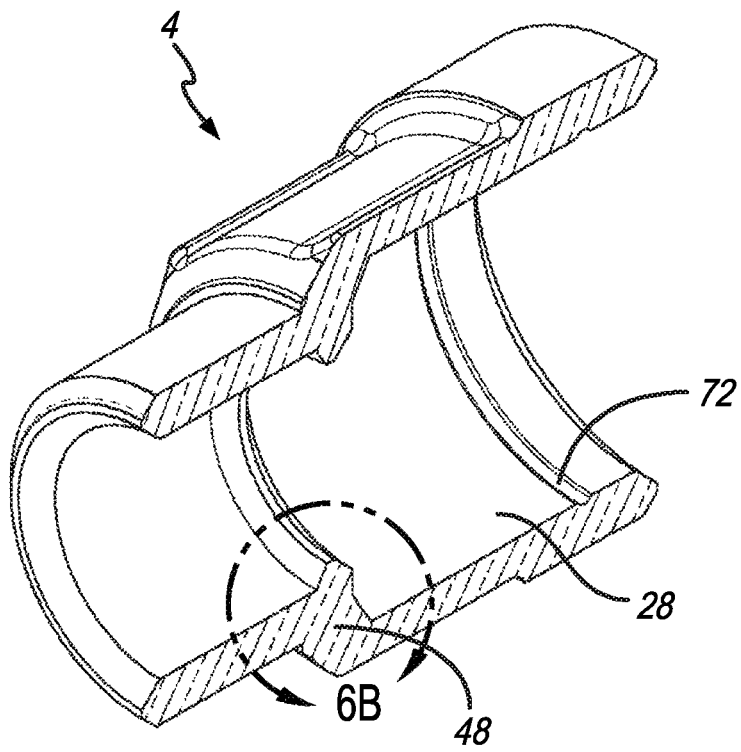
FIGS. 6A and 6B are perspective cutaway and cutaway detail views of the coupling body.
Figure 6B:
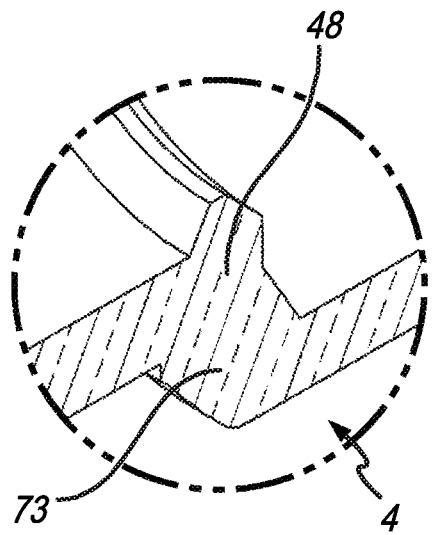

Perspective cutaway and cutaway detail views of coupling body 4 are shown in FIGS. 6A and 6B, respectively. The view shown in FIG. 6A depicts interior periphery 28 inside coupling body 4 which is configured to receive sleeve 32. Channel 72 is a retention groove configured to hold the sleeve in the coupling. Illustratively, retention dimples 54 and 56 will fit into channel 72 to hold the sleeve in place. Flange 48 is shown extending inwardly to provide reinforcement for rim flange 40 (see, e.g., FIG. 2) and a positive stop to separate the two pipes being coupled by coupling 2. As shown in FIG. 6B, the shape of flange 48 may be configured to mate with the shape of rim flange 40. In addition, supportive material 73 may be added opposite flange 48 to increase retention properties of coupling 2.

Figure 7:
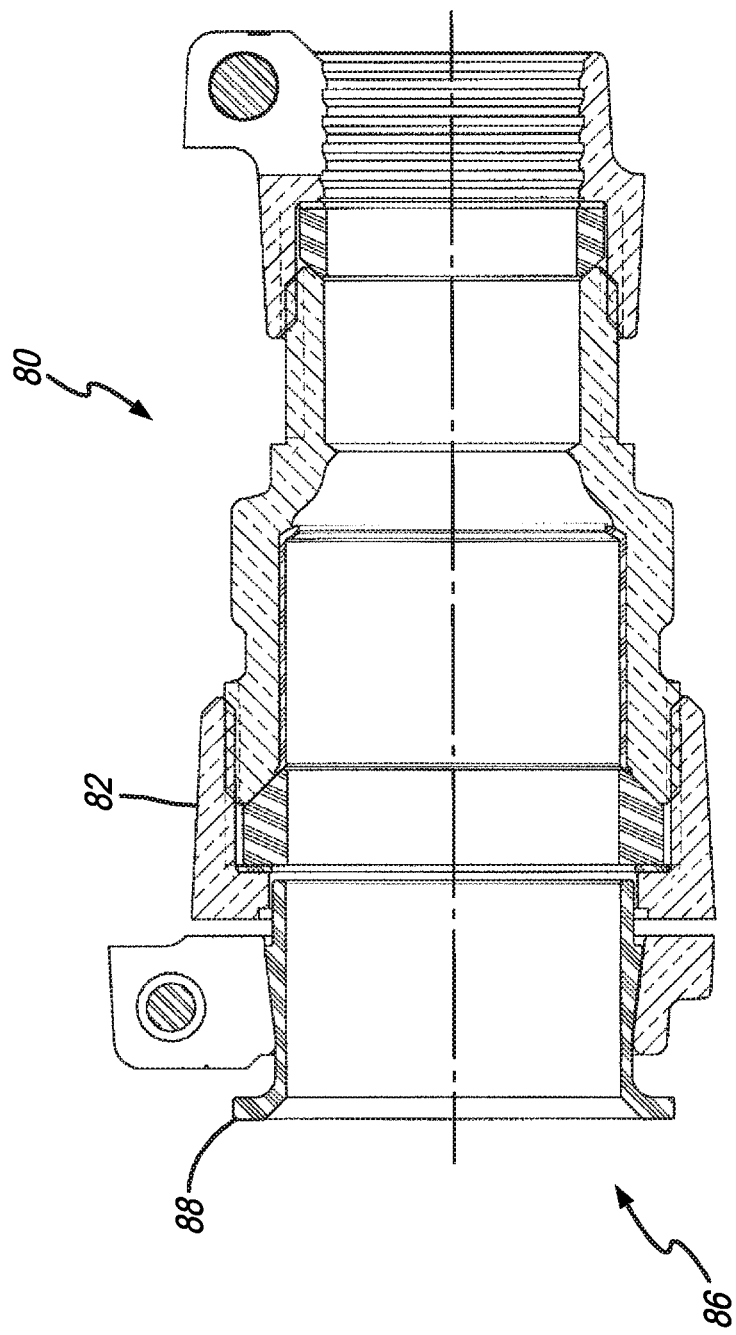
FIG. 7 is a cross-sectional view of another illustrative embodiment of a joint coupling according to the present disclosure.
Figure 8:
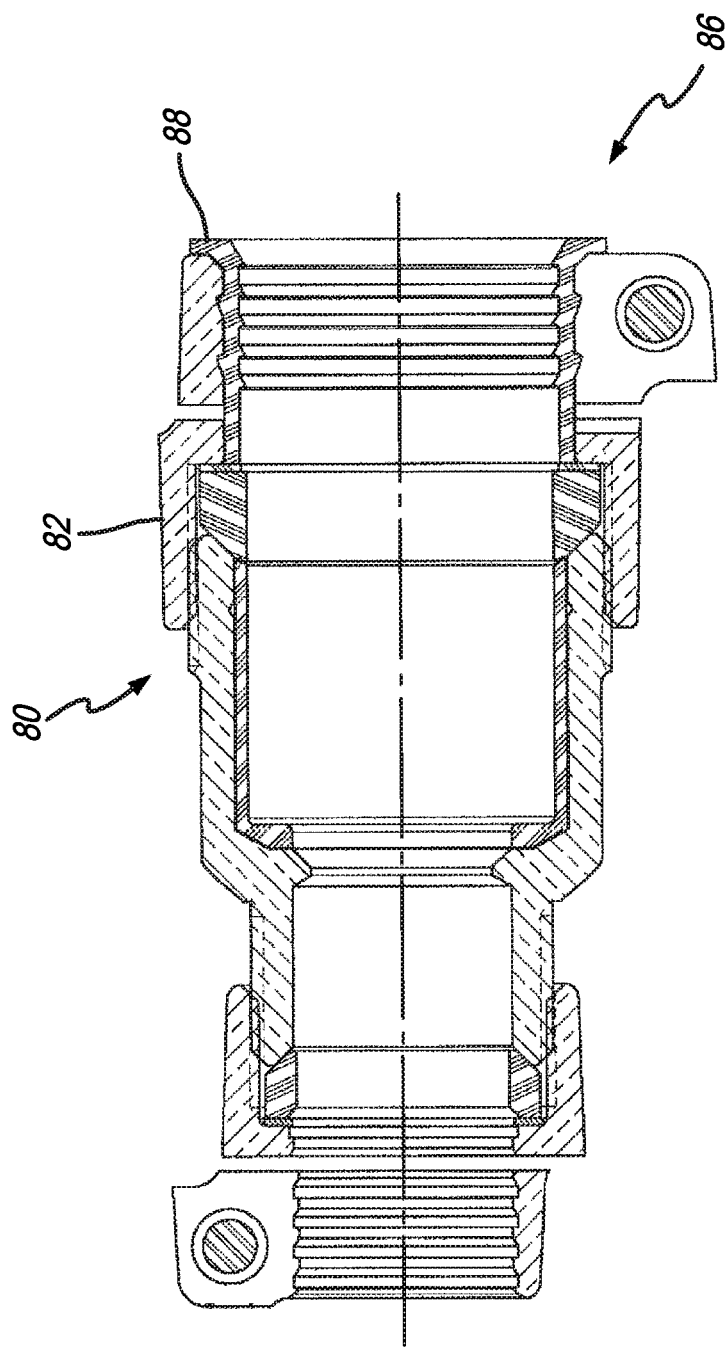
FIG. 8 is another cross-sectional view of another illustrative embodiment of the joint coupling.

The cross-sectional views of joint coupling 80 are shown FIGS. 7 and 8. In FIG. 7, a first pack nut joint 82. A sleeve 86 is configured to accommodate pack nut joint 82 and includes a lip 88 to maintain separation between the metal pipe and the metal coupling. This helps reduce the likelihood the metal pipe will contact the metal of the coupling. The view shown in FIG. 8 includes sleeve 86 fully inserted into pack nut joint 82. As shown in these views, the sleeves are configured to both separate structures of dissimilar metals while also assist in gripping the pipe, and seal the gasket around the pipe.

Figure 9:
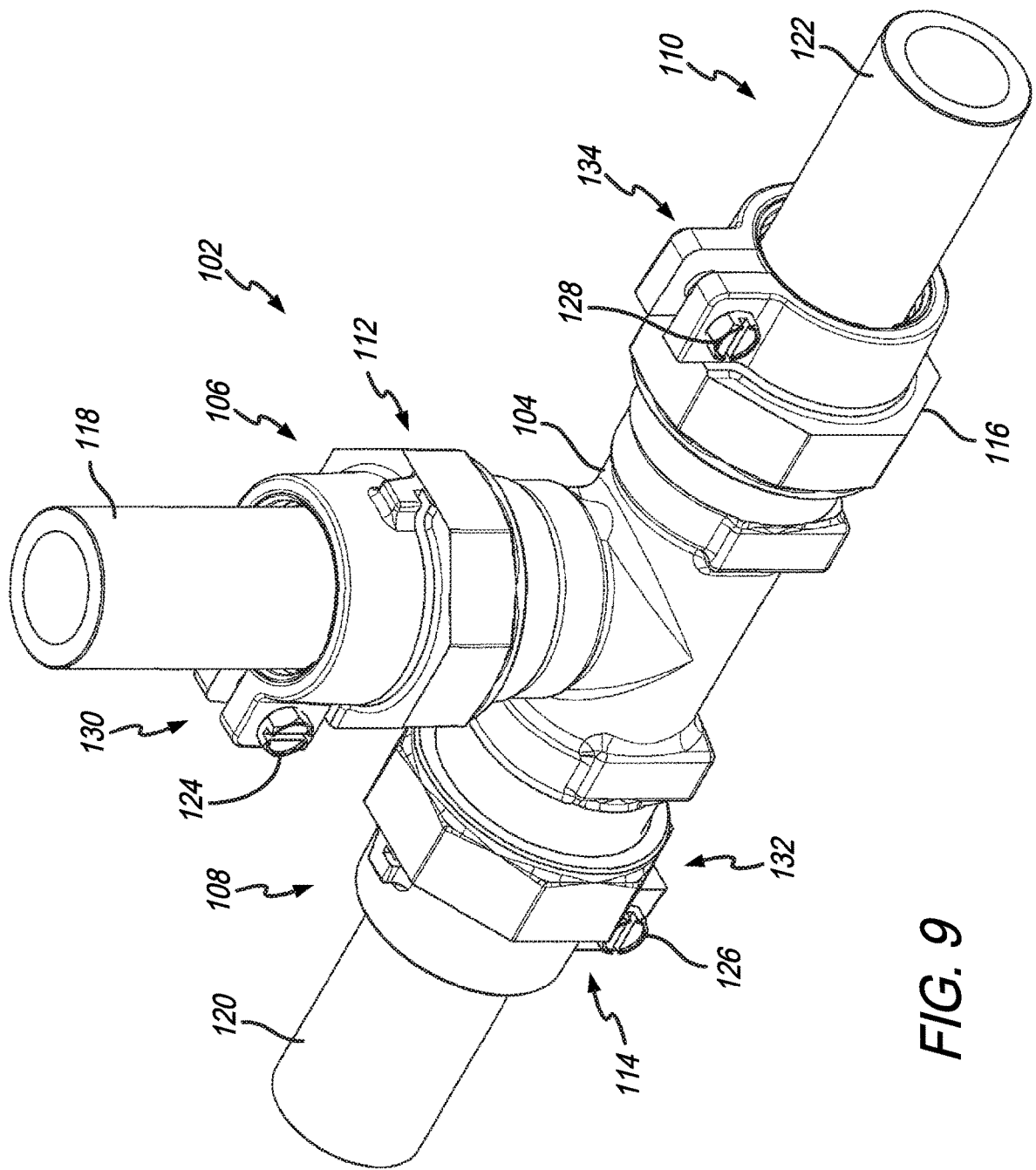
FIG. 9 is a perspective view of another illustrative embodiment of a pack joint insulated T-coupling according to the present disclosure.

Another illustrative embodiment of the present disclosure is directed to a pack joint insulated T-coupling 102, as shown in the perspective view of FIG. 9. In contrast to pack joint coupling 2 shown in FIG. 1, T-coupling 102 includes three pipe openings in a "T"-shaped configuration. T-body 104 includes a first end 106 that is oriented perpendicular to axially opposed ends 108 and 110 as shown. A pack joint nut 112 is illustratively threadably disposed on end 106 of T-body 104. Likewise pack joint nuts 114 and 116 are located on axially opposed ends 108 and 110, respectively. Pipes 118, 120, and 122 extending from pack joint nuts 112, 114, and 116, respectively, as illustratively shown. Like the prior embodiment, pipes 118, 120, and 122 may be made of a metal such as lead alloy whereas T-coupling 102 with its T-body 104 and pack joint nuts 112, 114, and 116 may be made of a brass alloy. Also similar to the prior embodiments are illustrative hex nut screws 124, 126, and 128 that each draw together flange ends 130, 132, and 134 of pack joint nuts 112, 114, 116, respectively. As shown in the side cross-sectional view of FIG. 10, the interior periphery 136 of T-body 104 form openings 138, 140, and 142 through which the pipes 118, 120, and 122, respectively, extend into. An insulating sleeve 144, 146, and 148 line these openings so that the inserting pipes do not contact the metal body of T-coupling 102 similar to that described with respect to pack joint coupling 2. If pipes 118, 120, or 122 are all made of lead, or at least one made of lead, they/it is a dissimilar metal to the brass T-body and the pipe joint nuts. Insulating sleeves 138, 140, and 142, respectively, assist preventing the pipes from coming into direct contact with T-coupling 102 to prevent direct contact between dissimilar metals. Also, similar to the prior embodiment is that sleeves 138, 140, 142 are configured to illustratively abut gaskets 150, 152, and 154, respectively, which help provide the seal between T-coupling 102 and pipes 118, 120, 122. Split insulating gripper sleeves 156, 158, and 160 fit around the inside periphery of pack joint nuts 112, 114, and 116, respectively, in abutting gaskets 150, 152, and 154, respectively, as previously described with respect to pack joint coupling 2. This prevents the metal-to-metal contact between the pipes and the brass pack joint nuts. As is appreciated from this view, T-coupling 102 has the capability to secure and seal three coupled pipes without any of the pipes physically touching any of the metal of the T-coupling.

Figure 10:
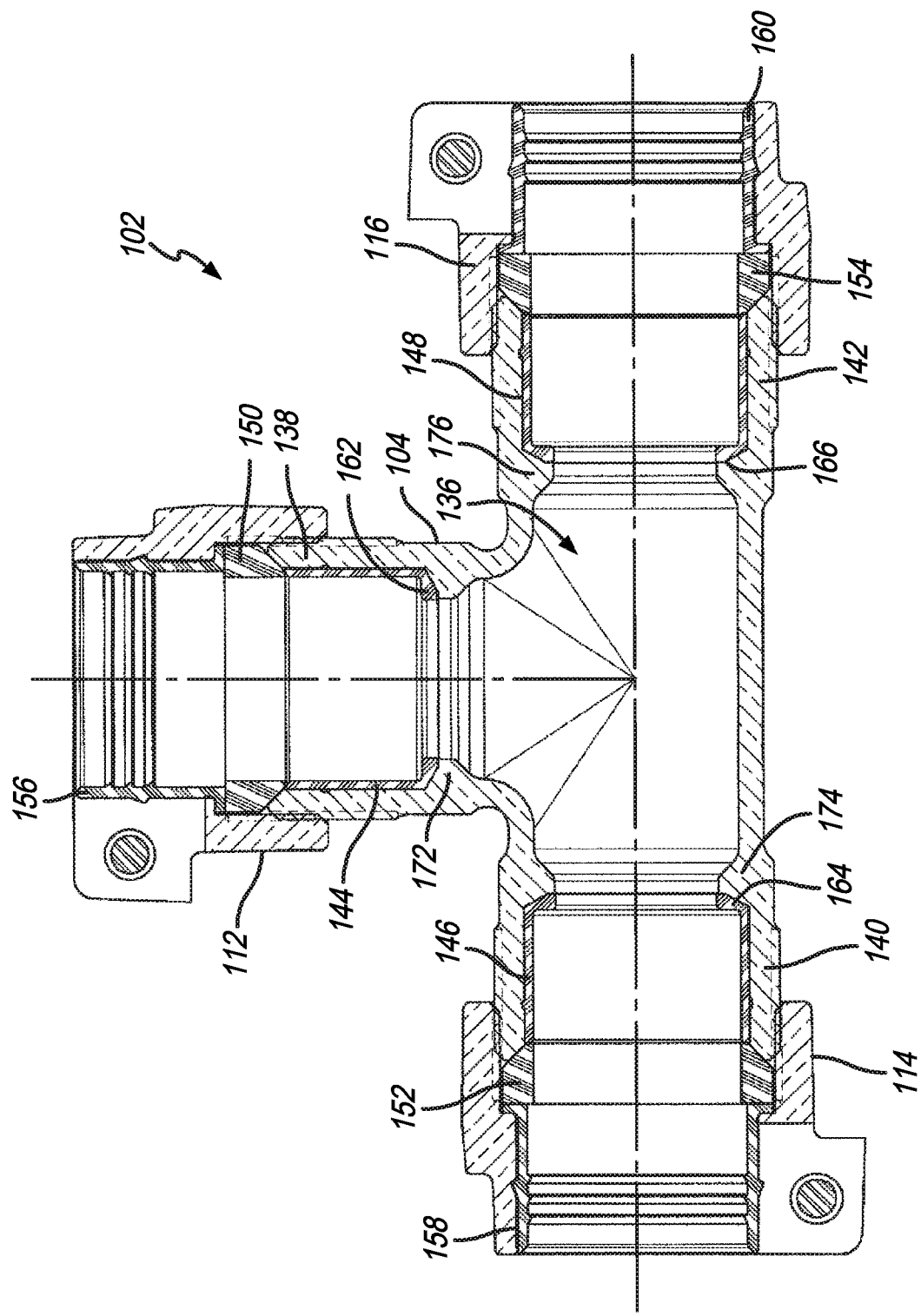
FIG. 10 is a cross-sectional view of the pack joint insulated T-coupling.

In the further embodiment also shown in FIG. 10, T-coupling 102 may also include spacers 162, 164, and 166 of insulating sleeves 144, 146, 148, respectively, to assist preventing any of the pipes from contacting each other when secured to T-coupling 102. Flange 172, 174, 176, assist in providing further space at spacers 162, 164, 166, respectively, as depicted with respect to pack joint coupling 2 above. Accordingly, physical metal-to-metal separation between pipes 118, 120, and 122 is maintained between all of those pipes. This means regardless whether all three pipes are the same metal and only the coupling is a different metal or one or more of the pipes are of dissimilar metal, there is no physical metal-to-metal contact between the structures physically touching.

Figure 11:
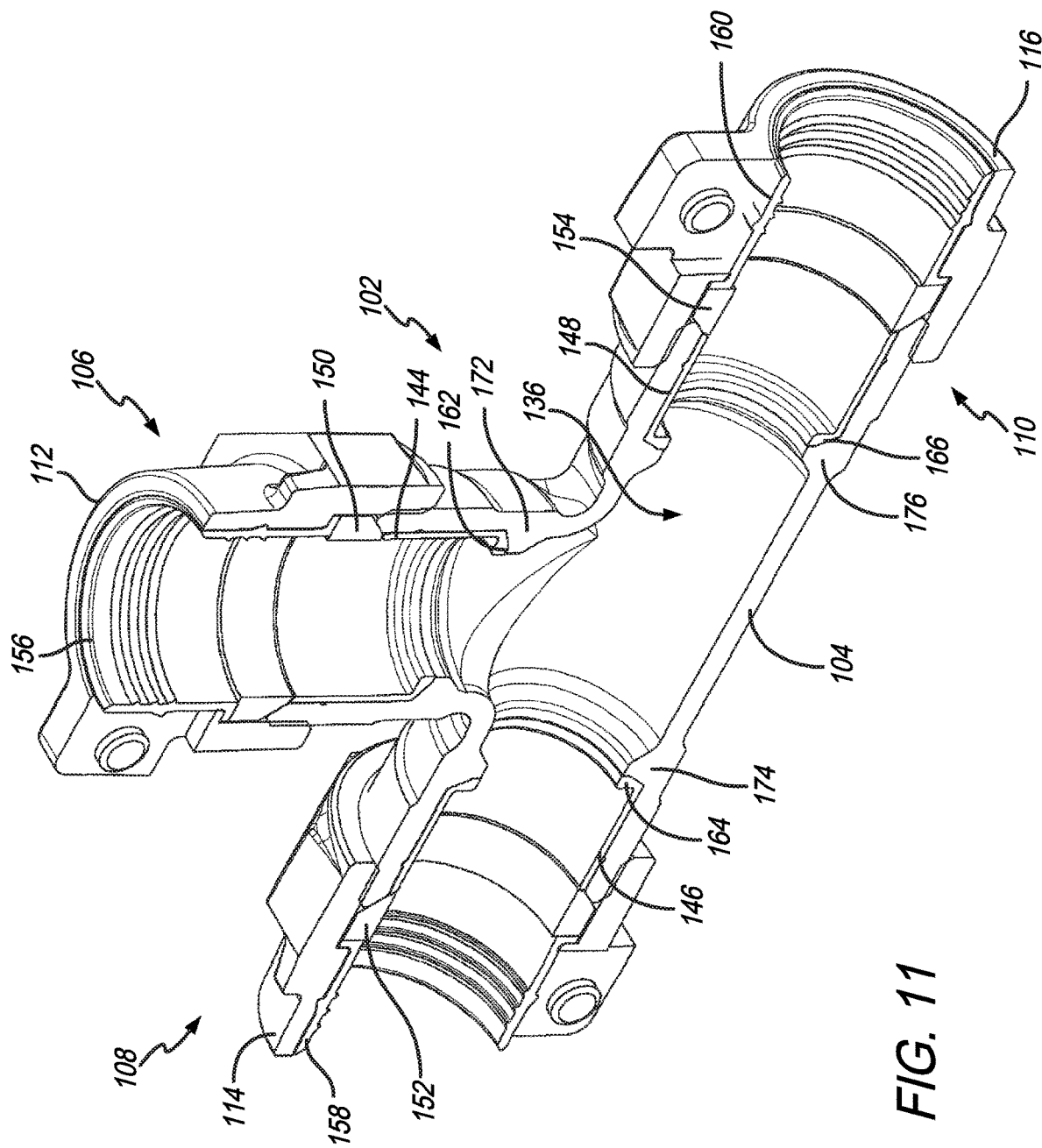
FIG. 11 is a perspective cross-sectional view of the pack joint insulated T-coupling.

A perspective cross-section view of T-coupling 102 is shown in FIG. 11. This view further depicts inner periphery 136 that creates fluid connection between first end 106 and axially opposed ends 108 and 110. Also, similar to the prior embodiment, this view further illustrates how flanges 172, 174, and 176 buttress spacers 162, 164, and 166, respectively, of insulating sleeves 144, 146, and 148, also respectively. With respect to insulting sleeves 144, 146, and 148, this view further depicts the relative positioning of the same with respect to gaskets 150, 152, and 154. It is also appreciated from this view that insulating gripper sleeves 156, 158, and 160 are stacked with the respective gaskets and insulating sleeves similar to the prior embodiment to isolate the pipes from direct contact with the metal of either T-body 104 or pack joint nuts 112, 114, and 116. As a result, even if T-coupling 102 is made of a different metal than any of the inserted pipes, there will not be direct metal to metal contact between the pipes and the T-coupling.

Figure 12:
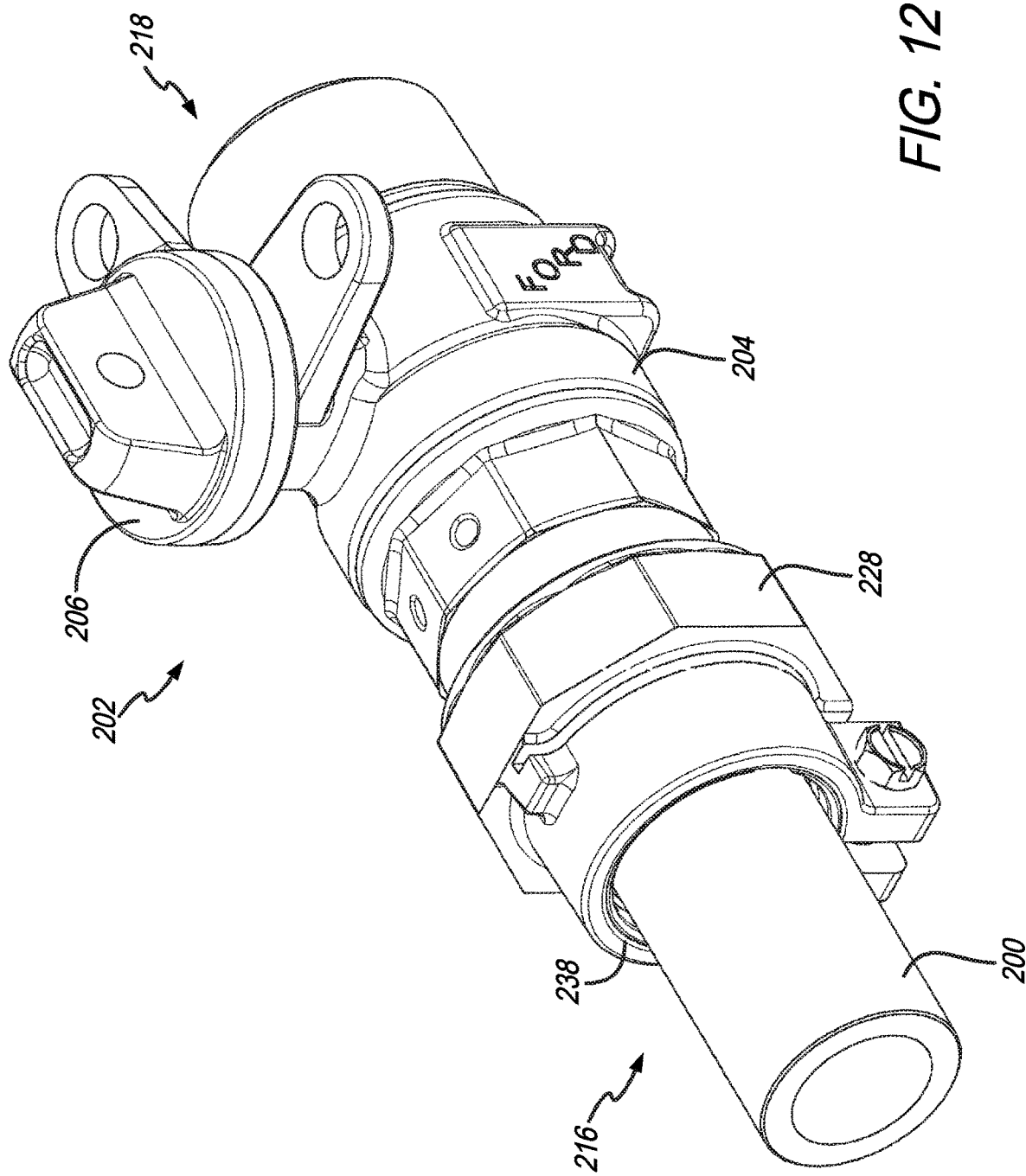
FIG. 12 is a perspective view of a pack joint ball valve according to the present disclosure.

Another illustrative embodiment of the present disclosure includes a pack joint insulated ball valve 202. A perspective view of such a pack joint ball valve 202 is shown in FIG. 12. This view depicts ball valve 202 having a body 204 and T-head 206 disposed there through between valve ends 216 and 218. A pack joint nut 228 is connected to end 216. It is appreciated that the pack nut joint 228 and body 204 may be made of brass. Additionally, T-head 206 may be made of a brass alloy or other metal. An illustrative pipe 200 is shown inserted into opening 238 of pack joint nut 228. As further demonstrated herein, although pack joint ball valve 202 fluidly couples pipe 200 to another structure, the metal components in pack joint ball valve 202 do not directly contact pipe 200. As discussed, if pipe 200 is made of metal this lack of direct metal to metal contact may be useful.

Figure 13:
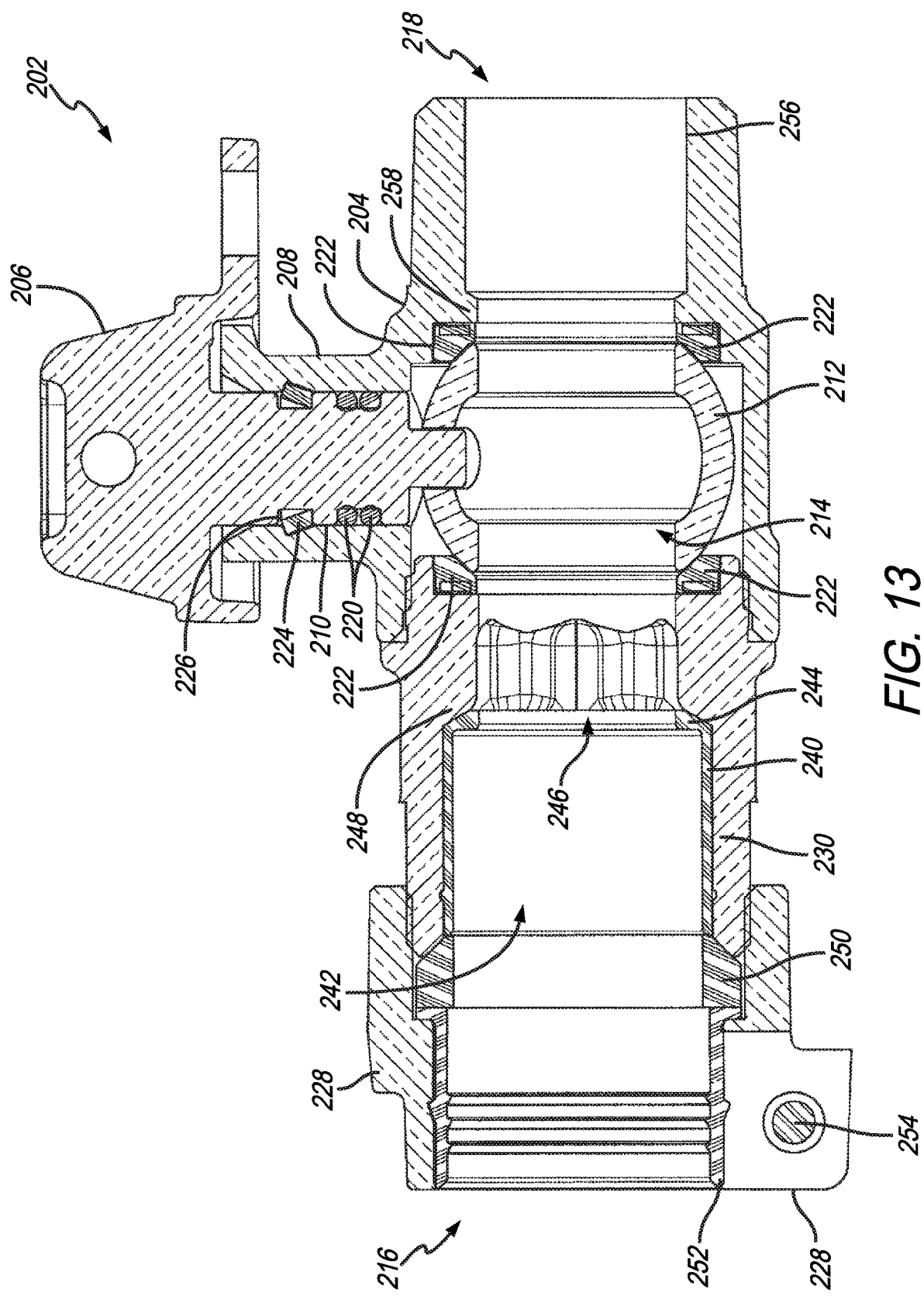
FIG. 13 is a cross-sectional view of the pack joint ball valve.

Another illustrative embodiment of the present disclosure is a pack joint ball valve assembly 202 as shown in FIG. 13. Ball joint valve assembly 202 includes a body 204 illustratively made of a brass alloy. A T-head 206 is configured to extend through neck 208 of body 204 and has an opening 210 disposed therein. A ball 212 having an opening 214 disposed there through is connected to T-head 206 such that when T-head 206 is rotated in a first direction ball 212 blocks any fluid passage between valve ends 216 and 218. In contrast, when T-head 206 is rotated in a second direction opening 214, as shown herein FIG. 13 provides fluid communication through body 204 and to ends 216 and 218. O rings 220, and reinforced seats 222 seal the ball 212 and T-head 206 to prevent leaking outside of the system. A lock ring 224 engages a notch 226 in T-head 206 to secure T-head 206 in opening 210 of neck 208.

Body 204 includes opening 230 at end 216 that is configured to receive an insulated sleeve 240 similar to that described in prior embodiments. Sleeve 240 includes an open end 242 that receives pipe 200, and spacer 244 that serves as the periphery for opening 246 located opposite open end 242. As discussed with prior embodiments, pipe 200, or other pipe may be inserted into pack joint ball valve 202 at end 216 inserted into end 242 of sleeve 240 and abut spacer 244 of sleeve 240. This insures that pipe 200 is seated properly in pack joint ball valve 202 without touching any metal from body 204.

Additionally, an abutment 248 buttresses spacer 244 as illustratively shown. Accordingly, fluid communication exists from pipe 200 and through opening 214 of ball 212 when in the open position to provide fluid communication to end 218. It is further appreciated that sleeve 240 may abut gasket 250 which also abuts insulating gripper sleeve 252 in similar manner discussed in previous embodiments. It is evident from the figure that pipe 200 may be inserted into pack joint ball valve 202 at end 216 through gripper sleeve 252, gasket 250, and sleeve 240 until it engages spacer 244. Hex head screw 254 can then be tightened to secure pack joint nut 228 to pipe 200 securing and sealing the same in pack joint ball valve 202, as discussed with prior embodiments. Opening 256 options at end 218 may also receive a pipe coupling meter or other structure, and may include its own second abutment 258 if a sleeve is thus needed to isolate that coupling as well. In certain embodiments, such a second sleeve may not be necessary if the connection is a like metal alloy to the brass pack joint ball valve 202 or is a polymer. In the illustrated embodiment, if pipe 200 is made of lead and the other attachments to end 218 are brass or similar metal such as copper, it is only pipe 200 that is needed to be isolated from physical contact with the metal of pack joint ball valve 202.

Figure 14:
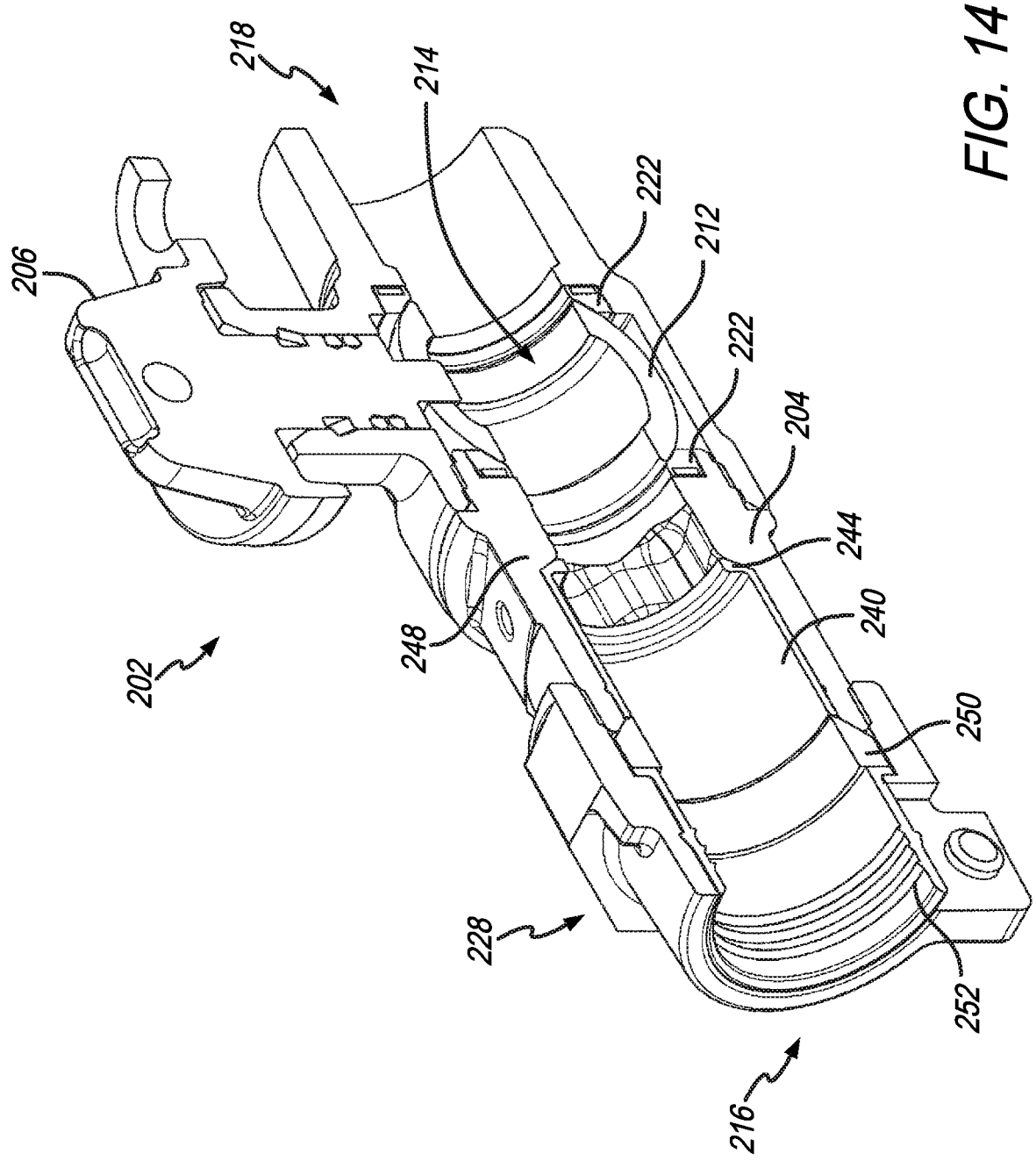
FIG. 14 is a perspective cross-sectional view of the pack joint ball valve.

A perspective cross-sectional view of pack joint ball valve 202 is shown in FIG. 14. This view provides another perspective of the interior of valve 202 and how insulated sleeve 240 along with gasket 250 and insulated gripper sleeve 252 can isolate a pipe from direct contact with the metal components of body 204 when inserted at end 216. It is also appreciated from this view that body 204 may be constructed of separate components as shown herein or may be a single cast unit. In either instance, the objective is to isolate the inserted pipe from physical contact with the metal of body 204 (whether one component or two). This view also shows how pack joint nut 228 with insulated gripper sleeve 252 inserted therein attach to body 204, but the metal bodies of both nut 228 and body 204 do not directly contact or touch metal pipe 200 (see, also, FIG. 12).

Figure 15:
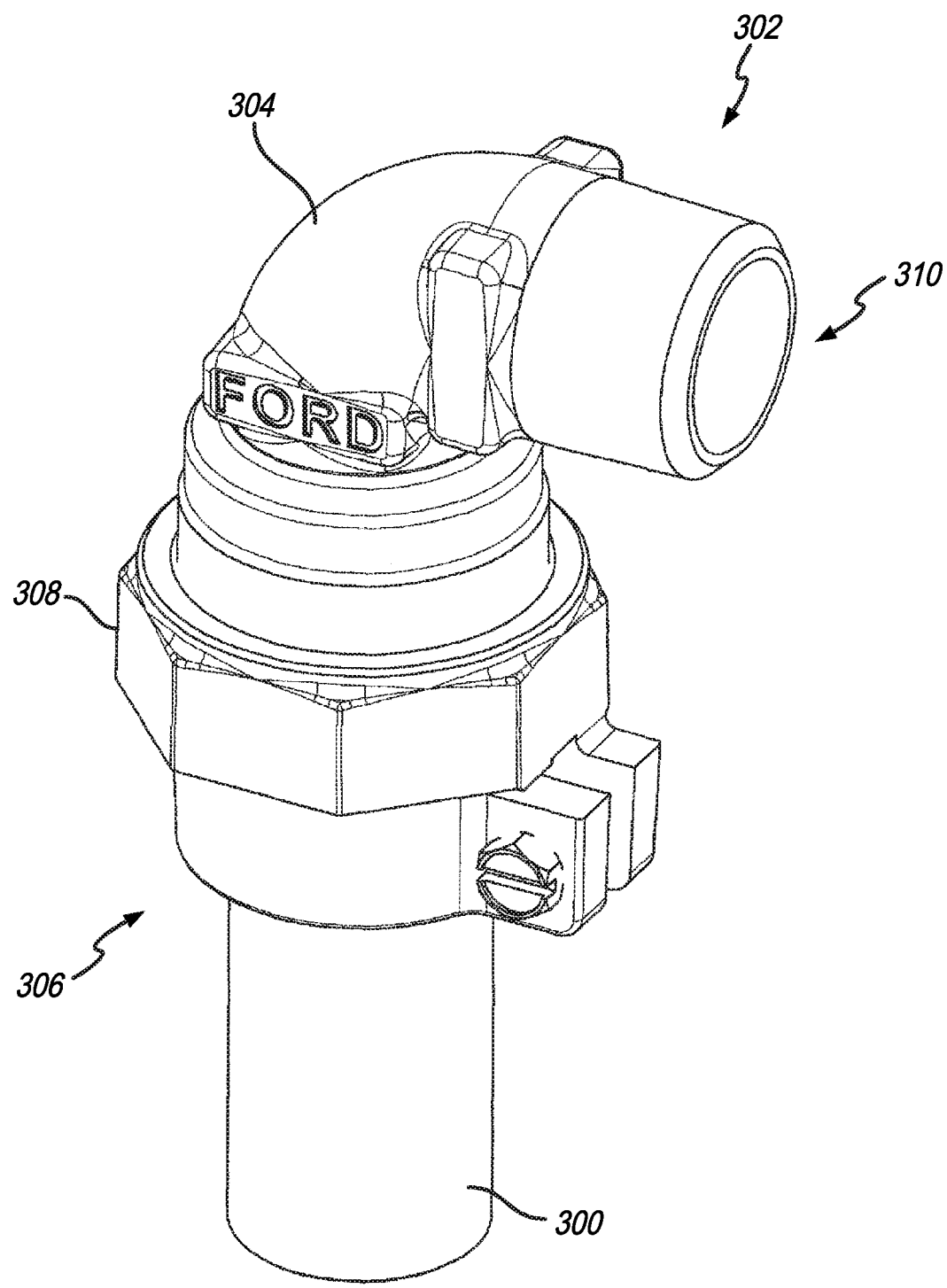
FIG. 15 is a perspective view of another illustrative embodiment of an insulated pack joint L-coupling according to the present disclosure.

Another illustrative embodiment of present disclosure provides an insulated pack joint L-coupling 302. It is appreciated that the L-coupling may be referred to as an elbow coupling as well. Such Ls or elbows are common in the waterworks industry. A perspective view of pack joint L-coupling 302 is shown in FIG. 15. In this illustrative embodiment, a pipe 300 may be inserted into pack joint L-coupling 302 at end 306. Pack joint L-coupling 302 also includes a body 304 and a pack joint nut 308 (similar to prior embodiments). Another opening 310 is illustratively located perpendicular to opening 306 receives pipe 300 that enables a change in flow direction of passing fluid 90 degrees. This L-coupling, in contrast, is configured to isolate pipe 300 from the metal material in body 304 and pack joint nut 300, similar to that described with respect to previous embodiments.

Figure 16:
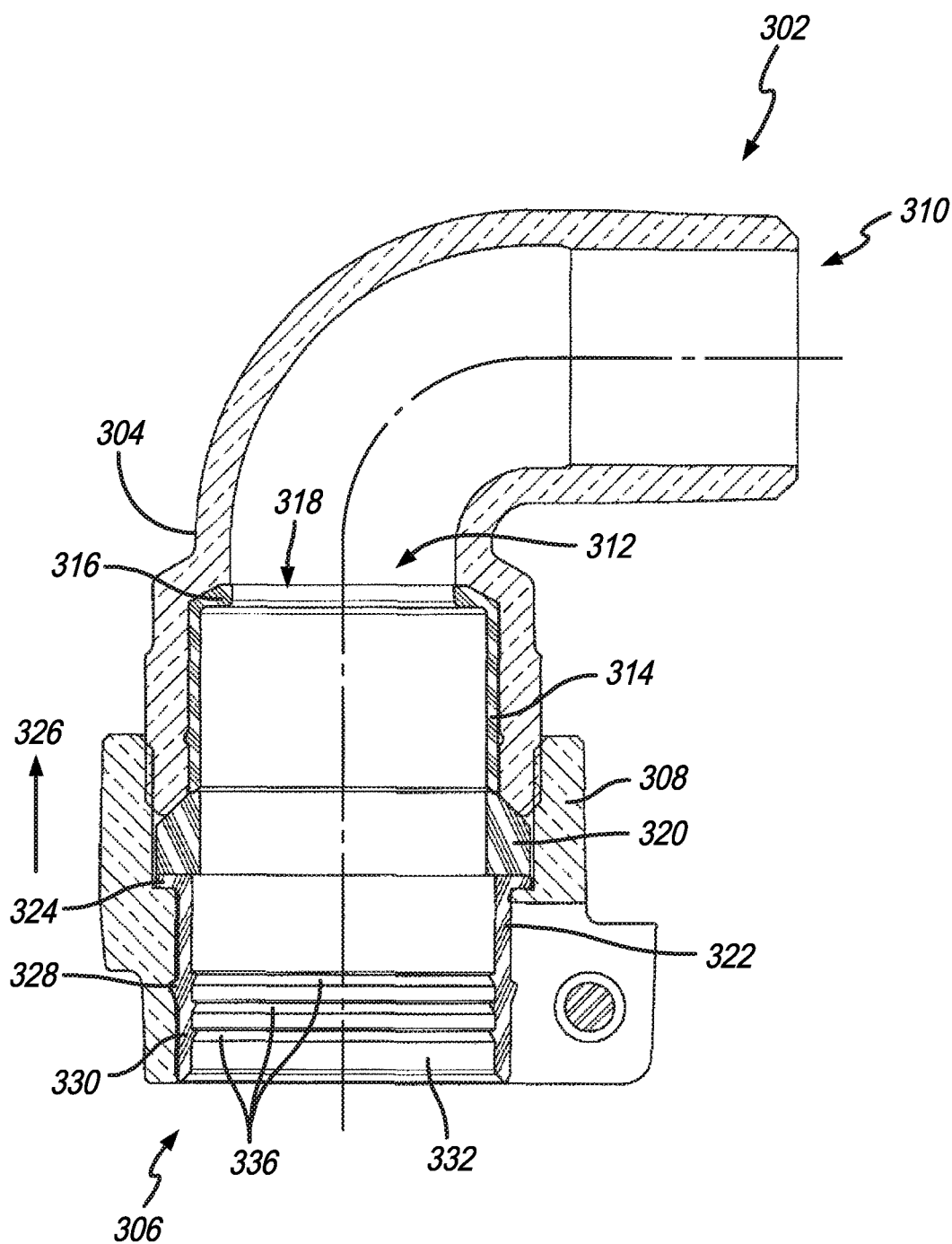
FIG. 16 is a cross-sectional view of the insulated pack joint L-coupling.

A side cross-sectional view of pack joint L-coupling 302 is shown in FIG. 16. Similar to the prior embodiments, attached to body 304 is pack joint nut 308. Inner periphery 312 which forms the fluid passage between ends 306 and 310 is configured to receive insulated sleeve 314 as illustratively shown. Like the prior embodiments, sleeve 314 includes spacer 316 that serves as the periphery to opening 318 to allow fluid passage from ends 306 to 310. At the same time, spacer 316 serves as an end point for a pipe such as pipe 300 to which it will extend. Again, spacer 316 combined with the remaining sleeve 314 insolates pipe 300 from having direct contact with the material, such as the brass alloy, that body 304 is composed of. And like the prior embodiments, gasket 320 is positioned adjacent sleeve 314 and insulating gripper sleeve 322 to isolate pipe 300 from physical contact with the metal in either body 304 or pack joint nut 308 while still allowing those components to hold and seal pipe 300 with respect to pack joint L-coupling 302. It is further appreciated in this view that insulating gripper sleeve 322 may include an outer peripheral surface 324 to abut and apply pressure onto gasket 320 when pack joint nut 308 is fastened to body 304, illustratively using threads, in direction 326. A barb 328 may be located on the outer surface 330 of insulating gripper sleeve 322 to engage pack joint nut 308 to assist holding sleeve 322 in place. And as previously identified, gripper features 336 may be formed on inner surface 332 of gripper sleeve 322 to apply a gripping force onto pipe 300.

Figure 17:
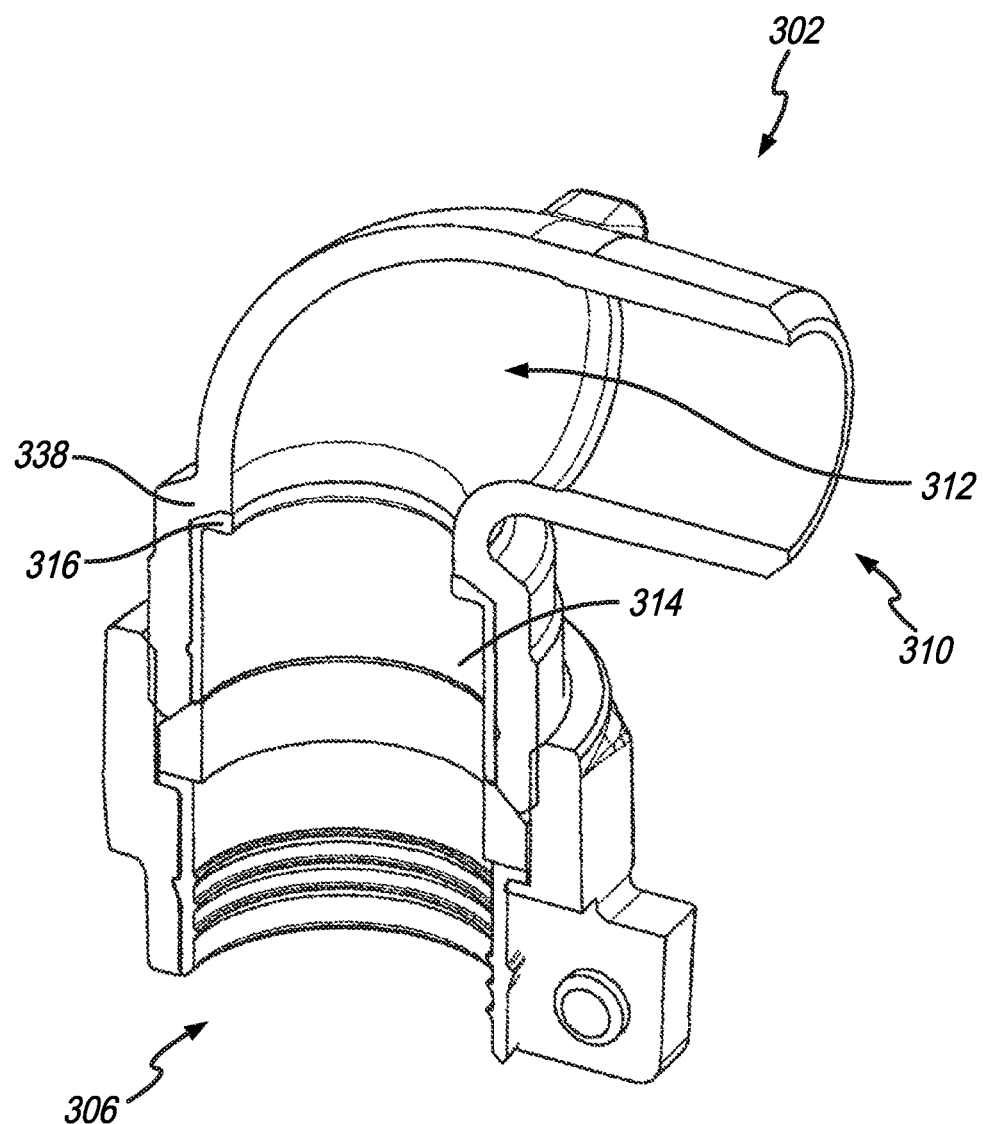
FIG. 17 is a perspective cross-sectional view of the insulated pack joint L-coupling.

A cross-sectional perspective view of pack joint L-coupling 302 is shown in FIG. 17. This view further depicts how inner periphery 312 of body 304 provides fluid communications between end 306 and 310. Also shown, is sleeve 314 with spacer 316 insolates any pipe that would be inserted into pack joint L-coupling 302 from physically contacting its metal body. This view also shows flange 338 on inner periphery 312 that serves as an abutment for spacer 316 to prevent pipe 300 from breaking through spacer 316 as well as providing sufficient fluid passage from pipe and into pack joint L-coupling 302.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

What is claimed is:

1. A pipe coupling comprising:
   a coupling body having an opening and configured to receive a pipe in the opening;
   wherein the coupling body is made of a metal material and the pipe is made of a different metal material to the metal material of the coupling body;
   wherein the opening leads to a fluid passageway in the coupling body formed by an inner periphery of the coupling body;
   an insulating sleeve that lines at least a portion of the inner periphery of the fluid passageway in the coupling body adjacent the opening;
   wherein the insulating sleeve is made of non-metallic material;
   wherein the insulating sleeve further comprises a flange extending inwardly from the insulating sleeve toward the fluid passageway at an end of the insulating sleeve;
   wherein the insulating sleeve is configured to serve as a physical non-metallic barrier between the metal material of the coupling and the different metal material of the pipe so the different metal material of the pipe does not contact the metallic material of the coupling body;
   a pack joint nut that has an interior passageway disposed therein; and
   a second insulating sleeve configured to line at least a portion of an inner periphery of the interior passageway of the pack joint nut so the different metal material of the pipe does not contact the inner periphery of the pack joint nut.

2. The pipe coupling of claim 1, wherein the pack joint nut is attachable to the coupling body and configured to receive the pipe in the interior passageway.

3. The pipe coupling of claim 2, wherein the second insulating sleeve includes at least one gripping ridge that extends from the second insulating sleeve towards the interior passageway of the pack nut joint, and a gasket located between the insulating sleeve of the coupling body and the second insulating sleeve of the pack joint nut.

4. The pipe coupling of claim 3, wherein the second insulating sleeve is a split insulating sleeve.

5. The pipe coupling of claim 1, wherein the metal material of the coupling body is a brass alloy.

6. The pipe coupling of claim 1, wherein the non-metallic materials of the insulating sleeve is selected from the group consisting of acetal, polypropylene, polyphenylene oxide, nylon, and polyethylene.

7. The pipe coupling of claim 1, further comprising a valve member in fluid communication with the coupling body.

8. The pipe coupling of claim 1, further comprising an elbow in fluid communication with the coupling body.

9. A pipe coupling comprising:
a coupling body having an opening;
a first insulating sleeve located on an interior surface of the coupling body;
wherein the first insulating sleeve includes a flange extending inwardly from the first insulating sleeve, away from the interior surface, and toward a fluid passageway in the coupling body by the interior surface of the coupling body at an end of the first insulating sleeve;
wherein the flange extends to line an interior shoulder of the coupling body;
a nut removably secured to a first end of the coupling body at the opening and configured to receive a pipe;
wherein the nut is made of a metal material and the pipe is made of a different metal material to the metal material of the nut;
a second sleeve that lines at least a portion of an inner periphery of the nut;
a gasket located between the first and second insulating sleeves;
wherein the first and second insulating sleeves are made of non-metallic material; and
wherein the first and second insulating sleeves are configured to serve as a physical non-metallic barrier between the metal material of the nut and the different metal material of the pipe so the different metal material of the pipe does not contact the metallic material of the nut.

10. The pipe coupling of claim 9, wherein the nut is a pack joint nut.

11. The pipe coupling of claim 9, wherein the second insulating sleeve is a split insulating sleeve.

12. The pipe coupling of claim 9, wherein the non-metallic material of the insulating sleeve is a polymer.

13. The pipe coupling of claim 11, wherein the split insulating sleeve includes a gripping feature in the form of at least one ridge to assist gripping the pipe.

* * * * *